United States Patent
Khlat et al.

(10) Patent No.: US 8,139,540 B2
(45) Date of Patent: Mar. 20, 2012

(54) ARRANGEMENT AND METHOD FOR DUAL MODE OPERATION IN A COMMUNICATION SYSTEM TERMINAL

(75) Inventors: Nadim Khlat, Cugnaux (FR); David Myara, Toulouse (FR)

(73) Assignee: Freescale Semiconductor, Inc., Austin, TX (US)

( * ) Notice: Subject to any disclaimer, the term of this patent is extended or adjusted under 35 U.S.C. 154(b) by 557 days.

(21) Appl. No.: 11/571,099

(22) PCT Filed: Jul. 2, 2004

(86) PCT No.: PCT/EP2004/007232
§ 371 (c)(1),
(2), (4) Date: Dec. 30, 2008

(87) PCT Pub. No.: WO2006/002677
PCT Pub. Date: Jan. 12, 2006

(65) Prior Publication Data
US 2009/0103489 A1    Apr. 23, 2009

(51) Int. Cl.
*H04W 36/00* (2009.01)
*H04B 7/216* (2006.01)
(52) U.S. Cl. ........ 370/331; 370/332; 370/341; 370/350; 370/335; 455/436
(58) Field of Classification Search ............... 370/331, 370/332, 341, 350; 455/436
See application file for complete search history.

(56) References Cited

U.S. PATENT DOCUMENTS

| | | | |
|---|---|---|---|
| 5,612,978 A | | 3/1997 | Blanchard et al. |
| 5,920,549 A | * | 7/1999 | Bruckert et al. ............. 370/331 |
| 5,943,333 A | | 8/1999 | Whinnett et al. |
| 6,456,858 B1 | * | 9/2002 | Streter ....................... 455/552.1 |
| 6,532,226 B1 | * | 3/2003 | Lehtinen et al. .............. 370/347 |
| 6,584,116 B1 | | 6/2003 | Gourgue et al. |
| 6,785,352 B1 | * | 8/2004 | Ranta ............................. 375/354 |
| 7,363,051 B2 | * | 4/2008 | Bridgelall .................. 455/553.1 |
| 7,480,273 B1 | * | 1/2009 | Raaf .............................. 370/331 |
| 7,649,869 B2 | * | 1/2010 | Mittal et al. .................. 370/332 |

(Continued)

FOREIGN PATENT DOCUMENTS

| | | |
|---|---|---|
| EP | 1073303 B1 | 11/2005 |
| EP | 0674454 B1 | 8/2006 |
| JP | 2003134569 | 5/2003 |
| JP | 2003134569 A * | 5/2003 |

OTHER PUBLICATIONS

JP Patent Laid Open Application No. 2003-134569, English computer translation.

*Primary Examiner* — Jinsong Hu
*Assistant Examiner* — Qun Shen

(57) ABSTRACT

An arrangement and method for discontinuous software FDD monitoring during TDD call allows removal of a conventional external notch filter in a dual mode WCDMA and PCS/DCS handset. The WCDMA RX frame is allowed to have a few slots corrupted by the PCS/DCS transmitter noise during DCS transmission, and a scheme is used to recover the required information by not considering the corrupted slots. Due to the fact that during WCDMA FDD RX monitoring, the processing required is performed in stages, and since the information that is measured during a WCDMA frame is repeated in every frame, the scheme of the invention is based on the idea that if a given slot is corrupted in a WCDMA frame, in the next WCDMA frame the slot will be no more corrupted due to the difference in timing between the PCS/DCS transmitter protocol and the WCDMA timing protocol.

20 Claims, 5 Drawing Sheets

U.S. PATENT DOCUMENTS

| | | | |
|---|---|---|---|
| 7,881,343 B2* | 2/2011 | Bichot et al. | 370/503 |
| 2003/0003951 A1 | 1/2003 | Leprieur et al. | |
| 2004/0152429 A1* | 8/2004 | Haub et al. | 455/102 |
| 2004/0176039 A1* | 9/2004 | Leyh et al. | 455/67.11 |
| 2005/0181822 A1* | 8/2005 | Sasaki et al. | 455/552.1 |
| 2006/0002323 A1* | 1/2006 | Hildebrand et al. | 370/321 |
| 2006/0171345 A1* | 8/2006 | Hildebrand et al. | 370/319 |

* cited by examiner

ARRANGEMENT AND METHOD FOR DUAL MODE OPERATION IN A COMMUNICATION SYSTEM TERMINAL

FIELD OF THE INVENTION

This invention relates to dual mode communication systems, and particularly (though not exclusively) to dual mode cellular communication systems such as, for example, UMTS (Universal Mobile Telephone System) systems where WCDMA (Wideband Code Division Multiple Access or WBCDMA) FDD (Frequency Division Duplex) cells coexist with DCS (Digital Cellular System) TDD (Time Division Duplex) cells. In such a cellular communication system, a mobile unit is required to monitor FDD cells when the mobile is already in an active call in TDD, e.g., the mobile is transmitting in DCS band in GSM and the mobile should monitor some WCDMA cells to allow future cell reselection or handover process to happen correctly. The invention is also applicable to other coexisting systems such as, for example, WCDMA (FDD mode) in the PCS (Personal Communication System) band while the mobile is transmitting in PCS (TDD mode), as is the case in the USA.

BACKGROUND OF THE INVENTION

In a prior art system in the field of this invention, it is known to use a hardware element in the form of a SAW (Surface Acoustic Wave) ceramic filter at the output of the power amplifier of a DCS transmitter to remove the noise generated in the WCDMA Receiver. This external filter is called notch filter since it is notching the generated TX (transmit) noise of the DCS in the WCDMA RX (receive) band. Since the WCDMA RX band is at minimum at 2110 Mhz and the DCS TX upper frequency is at 1980 Mhz, the delta in frequency is small, i.e., 130 Mhz, and since the power amplifier noise can be as high as 40 dB greater than the required level of receive noise, this results in the need to have a notch filter that filters more than 40 dB in a 130 Mhz offset at 1980 Mhz frequency, requiring a high Q filter, thus resulting in a higher insertion loss in the range of 1.5 dB-1.8 dB, which requires the output power in the DCS or PCS transmitter to be increased, which reduces the mobile's talk time significantly (e.g., by 20%).

Additionally, this known approach has the disadvantages that:
  providing an external notch filter in order to allow simultaneous monitoring of WCDMA RX during a DCS or PCS TX requires an extra part to be added, resulting in extra cost (typically in the range of US$1 for the SAW filter and matching element)
  extra PCB space (typically of the order of 70 mm$^2$) must be provided for the extra part(s)
  lower output power is available at the antenna in DCS or PCS band, due to the extra insertion loss of the notch filter, resulting in a potential issue to comply with the 3GPP (3$^{rd}$ Generation Partnership Project) specification.
The external notch filter attenuation also changes over temperature, resulting in difficulty to achieve desired attenuation (e.g., 40 dB) in the WBCDMA RX band over the temperature range of a mobile cellular unit.

The above disadvantages are increased if the mobile is required to support 2 types of dual mode operation, as in a 3G 'world phone', where at the same mobile unit UMTS is supported in Europe (WCDMA in 2110 Mhz and DCS) and WCDMA and PCS are supported in the US bands, resulting in two notches and more stringent notch insertion loss for the US case since the PCS band will be near the WCDMA band in the PCS band.

A need therefore exists for FDD monitoring during TDD call wherein the abovementioned disadvantage(s) may be alleviated.

STATEMENT OF INVENTION

The present invention provides monitoring apparatus and a wireless communication terminal as described in the accompanying claims.

BRIEF DESCRIPTION OF THE DRAWING(S)

One arrangement and method for discontinuous software FDD monitoring during a TDD call in a dual band wireless cellular UMTS/GSM (Universal Mobile Telephone System/Global System for Mobile communications) mobile terminal incorporating the present invention will now be described, by way of example only, with reference to the accompanying drawings, in which.

DESCRIPTION OF PREFERRED EMBODIMENT(S)

Figure 1:
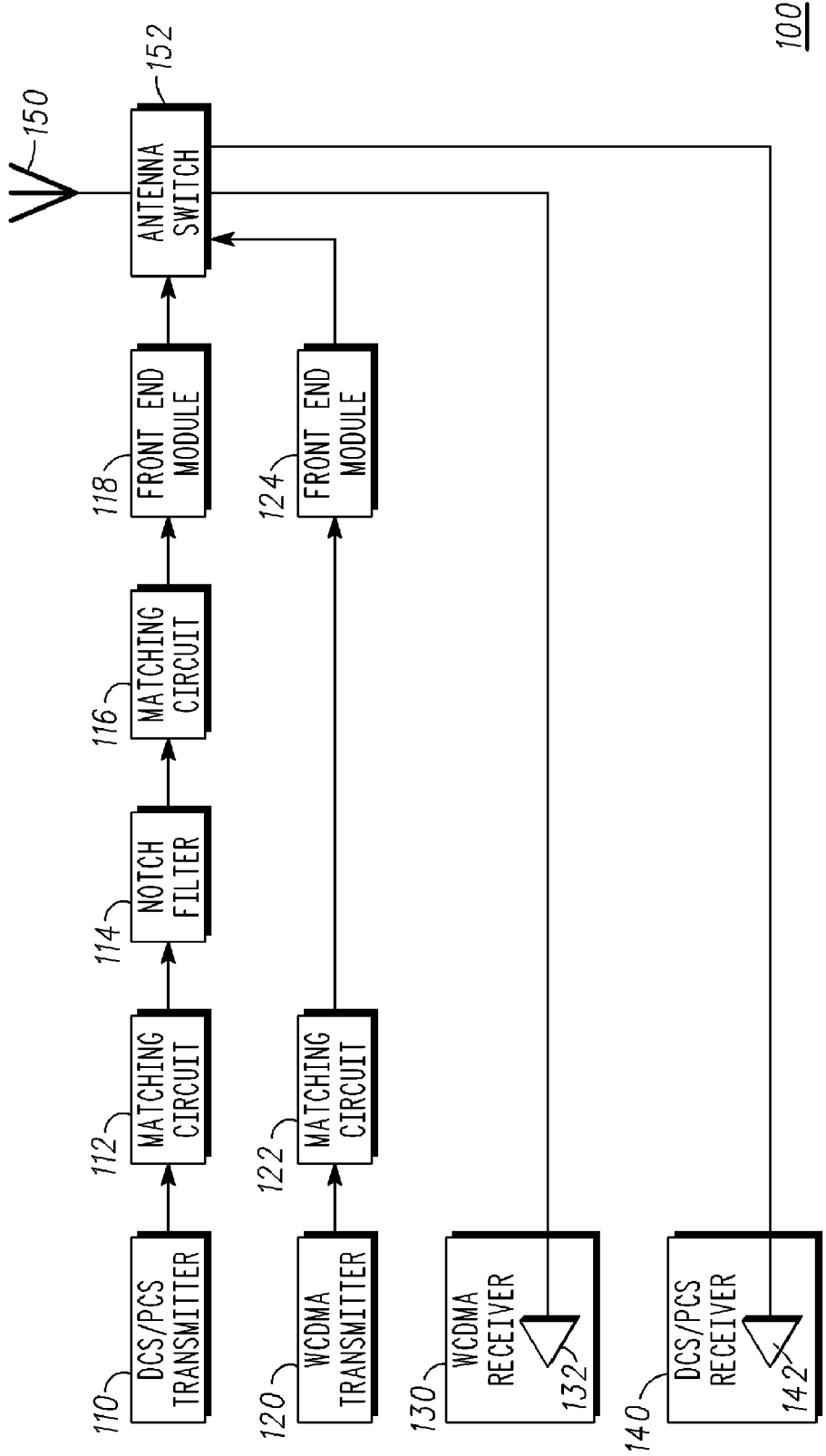
FIG. 1 shows a block schematic diagram illustrating a prior art dual mode WCDMA and PCS/DCS cellular communication handset.

Referring firstly to FIG. 1, a known dual mode WCDMA and PCS/DCS cellular communication handset 100 includes a DCS/PCS transmitter 110-118, a WCDMA transmitter 120-124, a WCDMA receiver 130, and a DCS/PCS receiver 140. The DCS/PCS transmitter has a DCS/PCS power amplifier 110, matching circuitry 112, a ceramic SAW notch filter 114, matching circuitry 116 and an associated front end module 118. The WCDMA transmitter has a WCDMA power amplifier 120, matching circuitry 122 and an associated front end module 124. The WCDMA receiver 130 has a low noise amplifier 132. The DCS/PCS receiver 140 has a low noise amplifier 142. The DCS/PCS transmitter, the WCDMA transmitter, the WCDMA receiver and the DCS/PCS receiver are coupled to an antenna 150 via antenna diplexing and/or antenna switch 152.

Figure 2:
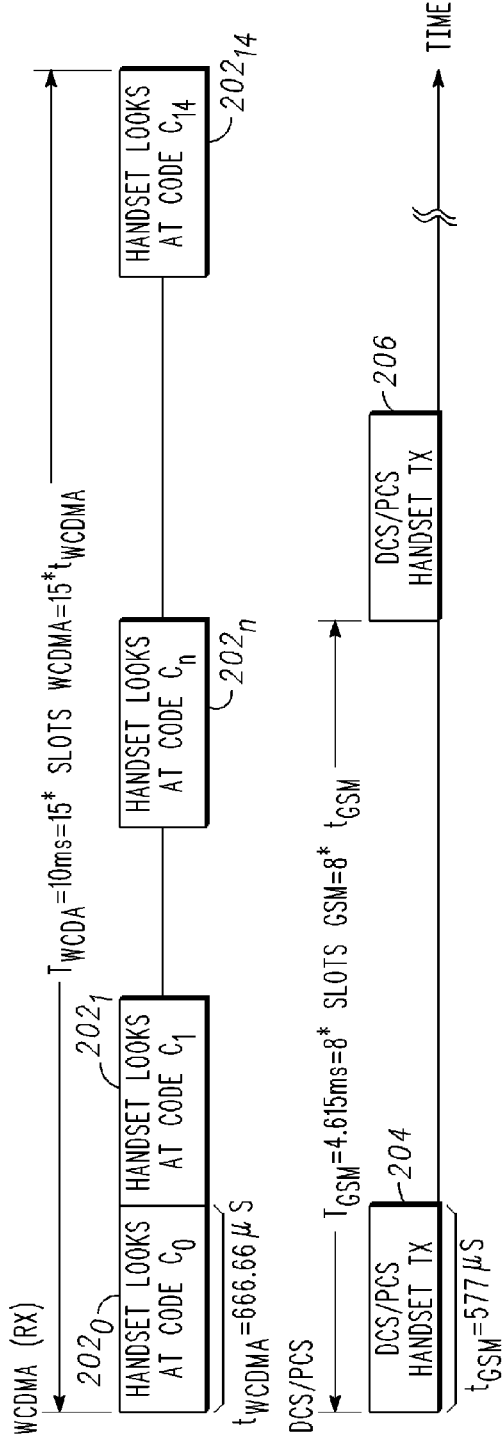
FIG. 2 shows a block schematic timing diagram illustrating overlapping slots in frames of the WCDMA (receive) and the PCS/DCS (transmit) modes of the system of FIG. 1.

Referring now also to FIG. 2, when the handset 100 is in WCDMA (FDD) receive mode (upper part of figure) all WCDMA base station codes $C_0$ through $C_{14}$ are always 'on' in each WCDMA frame, and the handset looks at each of the codes $C_0$-$C_{14}$ in respective slots $202_0$-$202_{14}$. Each of the fifteen WCDMA slots $202_0$-$202_{14}$ has a duration $t_{WCDMA}$ of 666.666 μs=2560*Tchip where Tchip is the WCDMA chip period equal to 1/3840 kbit/s, and each WCDMA frame has a duration $T_{WCDMA}$ of 10 ms (15*$t_{WCDMA}$) or equal to $T_{WCDMA}$=38400*Tchip.

In DCS/PCS (TDD) mode (lower part of figure) a DCS/PCS transmission slot (two consecutive slots 204 and 206 being shown) of duration $t_{GSM}$ occurs with a period $T_{GSM}$ of 4.615 ms (8*$t_{GSM}$) where $t_{GSM}$=156.25*Tbits where Tbits is the GSM bit period equal to Tbits 1/270.833 Kbit/s, thus $T_{GSM}$=1250*Tbits.

If we express the GSM timing referenced to a WCDMA chip count, one DCS/PCS transmission slot (e.g., 204) length is equal to 156.25*Tbits/Tchip=2215.3873 chips of WCDMA.

When the cellular handset or mobile 100 is in a DCS/PCS call, software monitors the WCDMA band for possible handover and/or cell reselection. The process involves physically monitoring the entire 5 MHz channel and reviewing the power/synch information for each FDD base station (WCDMA). The physical channel remains unchanged. The mobile needs to measure the level of the FDD basestation and also decode which basestation it is reading by determining the code sequence $C_0, C_1 \ldots C_n \ldots C_{14}$. Each FDD basestation has a unique sequence code $C_0, C_1 \ldots C_n \ldots C_{14}$ among 64 possible sequence codes transmitted on SCH 2 channel and this is repeated in every WCDMA frame of 10 ms.

The DCS/PCS process involves synchronous periodic transmissions to the DCS/PCS network. The GSM handset transmissions and the WCDMA base station monitoring are asynchronous to each other.

Figure 3:
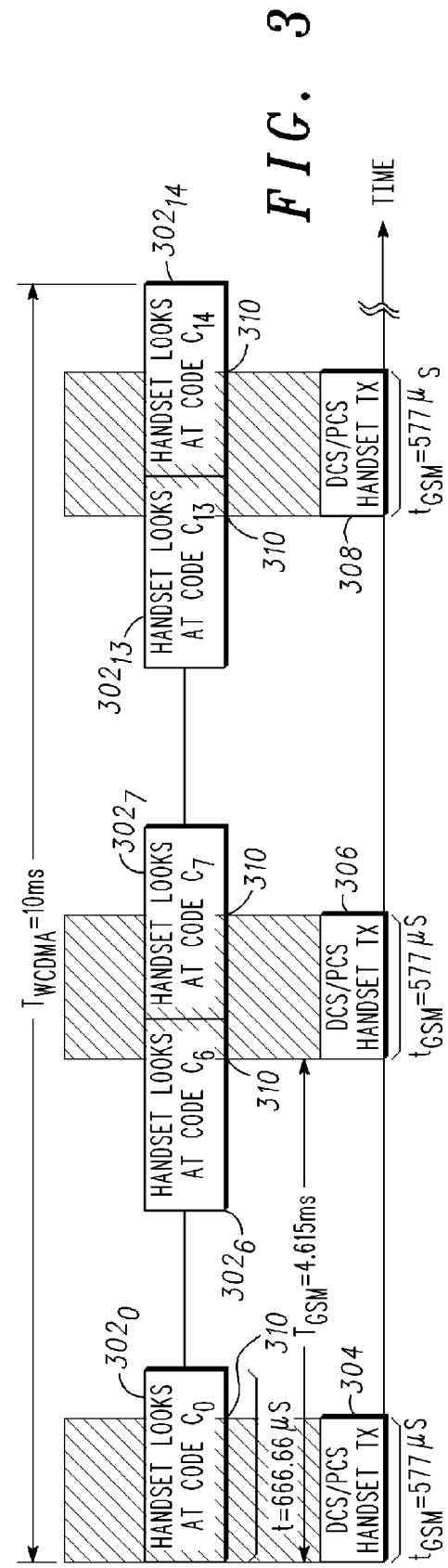
FIG. 3 shows a block schematic timing diagram, similar to that of FIG. 2, illustrating collisions/interference between overlapping slots in frames of the WCDMA (receive) and the PCS/DCS (transmit) modes of the system of FIG. 1.

Referring now also to FIG. 3, in a WCDMA frame having slots $302_0 \ldots 302_6, 302_7 \ldots 302_{13}, 302_{14}$ in which the handset looks at codes $C_0 \ldots C_6, C_7 \ldots C_{13}, C_{14}$, DCS/PCS transmissions in slots 304, 306 and 308 cause interference/collisions in the hatched areas as shown at 310.

Assuming the DCS/PCS TX slot 304 is aligned with WCDMA $C_0$ slot $302_0$:

Basestation code bits (SCH2) for $C_0, C_6, C_7, C_{13}$ & $C_{14}$ will be corrupted in the (first) 10 ms WCDMA frame as shown in the figure. Because of the timing relationship between the DCS/PCS TX slots and the code slots of WCDMA frames, it will be understood that corruption continues in the next two consecutive WCDMA frames as follows.

Basestation code bits (SCH2) for $C_5, C_6, C_{11}$ & $C_{12}$ will be corrupted in the next consecutive (second) frame 10 ms WCDMA frame.

Basestation code bits (SCH2) for $C_4, C_5, C_{10}$ & $C_{11}$ will be corrupted in the next consecutive (third) 10 ms WCDMA frame.

Figure 4A:
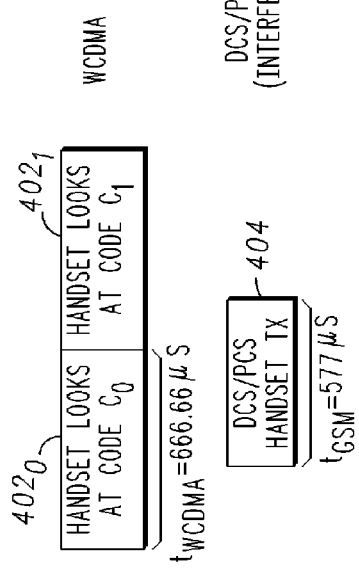
FIG. 4A and FIG. 4B show block schematic timing diagrams illustrating different types of collisions/interference between overlapping slots in frames of the WCDMA (receive) and the PCS/DCS (transmit) modes of the system of FIG. 1.

Referring now also to FIG. 4, it will be understood that two types of corruption of WCDMA code slots by DCS/PCS TX slots can occur:

1) As shown in FIG. 4A, if $t_{GSM} < t_{WCDMA}$ a single DCS/PCS transmission slot 404 can at most interfere with two WCDMA base station code slots $402_0$ and $402_1$.

Figure 4B:
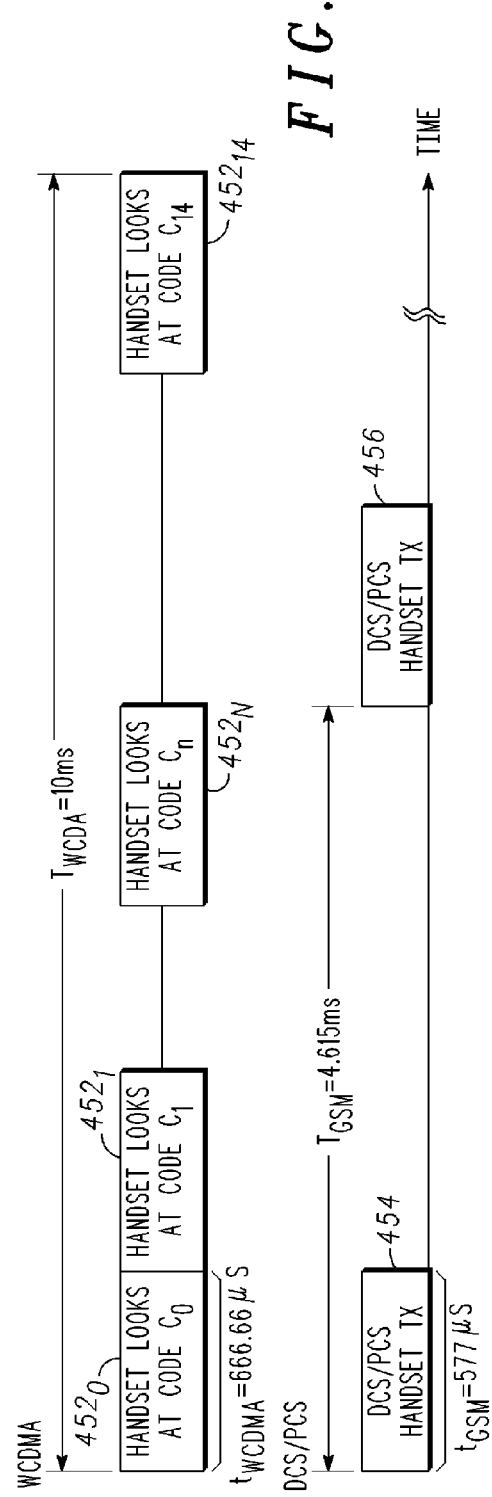

2) As shown in FIG. 4B, since $T_{GSM}$=4.615 ms and $T_{WCDMA}$=10 ms, two complete DCS/PCS transmission cycles occur in one WCDMA frame ($T_{WCDMA}/T_{GSM}$=10/4.615>=2). Thus, the two consecutive DCS/PCS TX slots 454 and 456 can interfere with WCDMA code slots $452_0$-$452_{14}$ in a single WCDMA frame. Also, it will be understood that the next interference cycle in the next WCDMA frame can be considered as interference from the pair of DCS/PCS TX slots 454 and 456 shifted by 770 μs (10−2*4.615) successively for each subsequent WCDMA frame. The effective shift expressed in number of WCDMA chip count is equal to $(T_{WCDMA} - 2*T_{GSM})$/Tchip=38400−2*1250*Tbit/Tchip=2953.80 count of WCDMA chips. The shift of 2953.80 count of WCDMA chips is greater than a WCDMA slot which is equal to 2560 WCDMA chips.

Figure 5:
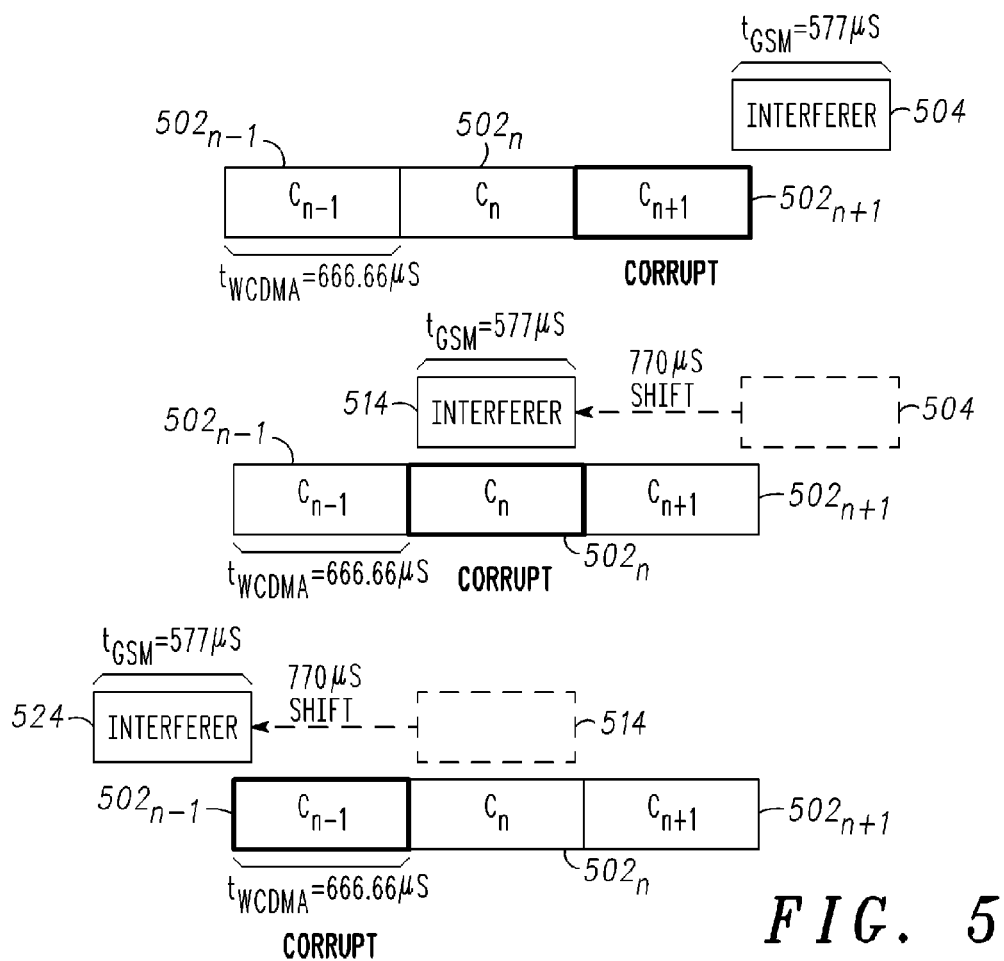
FIG. 5 shows a block schematic timing diagram illustrating collisions/interference between slots in three consecutive frames of the WCDMA (receive) mode and overlapping slots in the PCS/DCS (transmit) mode of the system of FIG. 1.

Referring now to FIG. 5, it can be seen that in a first WCDMA frame (upper part of figure) an interferer DCS/PCS TX slot 504 interferes with a WCDMA code slot $502_{n+1}$ associated with code $C_{n+1}$, and causes this code to be corrupted (as shown in bold outline in the upper part of the figure) in the handset/mobile.

In the next consecutive (second) WCDMA frame (middle part of figure) an interferer DCS/PCS TX slot 514 (equivalent to the slot 504 shifted by 770 μs) interferes with a WCDMA code slot $502_n$ associated with code $C_n$, and causes this code to be corrupted (as shown in bold outline in the upper part of the figure) in the handset/mobile.

In the next consecutive (third) WCDMA frame (lower part of figure) an interferer DCS/PCS TX slot 524 (equivalent to the slot 514 shifted by 770 μs) interferes with a WCDMA code slot $502_{n-1}$ associated with code $C_{n-1}$, and causes this code to be corrupted (as shown in bold outline in the upper part of the figure) in the handset/mobile.

The present invention is based on the following observation by the inventors:

if a DCS/PCS transmission is interfering with a monitored WCDMA base station code in one slot of SCH2, then on the next interferer cycle pair it will shift into an adjacent and earlier base station code slot. In the next WCDMA frame it will have shifted again to the next adjacent and earlier base station code slot. Therefore, if the DCS/PCS transmission interferes with 2 codes then in 3 WCDMA frames (3 interferer cycle pairs) it will have moved into base station codes that have already been correctly read (e.g.: $C_0, C_6, C_7, C_{13}, C_{14}$ are corrupted during the first frame; $C_0, C_7, C_{14}$ are non-corrupted during the second frame; $C_6, C_{13}$ are non-corrupted during the third frame).

The present invention utilizes a time diversity scheme based on the above observation. In a preferred embodiment, this is implemented by discarding or disabling WCDMA slot measurement when a DCS/PCS transmission occurs, and updating a handover decision database only after collecting data over 3 WCDMA frames (30 ms).

As is well known, cell measurement procedure for WCDMA cells identified while in DCS/PCS mode is performed in three stages:

Stage 1—Slot synchronization is performed on P-SCH (Primary Synchronisation Channel) as for normal cell selection.

Stage 2—Frame synchronization is performed on S-SCH (Secondary Synchronisation Channel). Moreover, AFC information is provided using correlations with PSC (Primary Synchronisation Code).

Stage 3—CPICH (Common Pilot Channel) is demodulated on one slot with known SCN (Switched Circuit Network). CPICH RSCP (Received Signal Code Power) and CPICH Ec/No (ratio of the received energy per PN—pseudo noise—chip for the CPICH to the total received power spectral density) is calculated.

Figure 6:
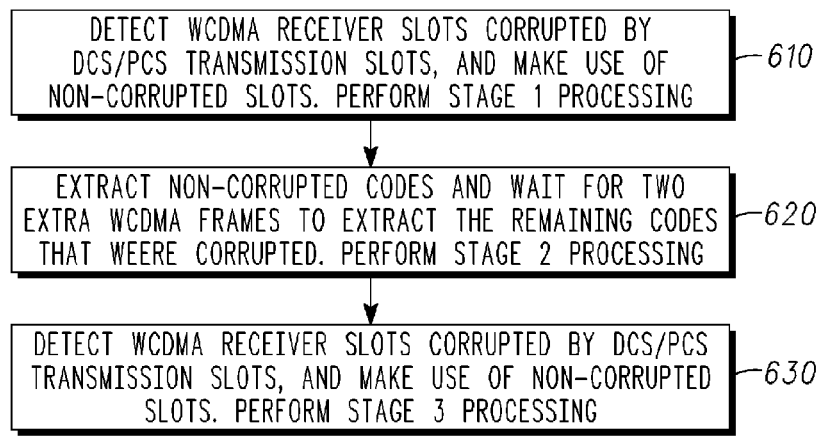
FIG. 6 shows a flow chart illustrating the processing method employed in a preferred embodiment of the present invention.

Referring now to FIG. 6, as will be explained in greater detail below, in its preferred embodiment the invention is based on skipping the corrupted slots and make use of non-corrupted slots for stage 1 (step 610) and stage 3 (step 630) processing, and for stage 2 (step 620) extracting corrected codes and waiting for two extra WCDMA frames to extract the remaining codes that were corrupted.

Considering in more detail processing stages 1-3 in the preferred embodiment of the present invention:

During Stage 1 processing where it is required to determine the WCDMA slot synchronization, i.e., the slot timing, corrupted slots are not used, and there is at least one non-corrupted slot in a WCDMA frame. Thus, stage 1 can be done in less than 1 WCDMA frame as if a notch filter was not removed.

During Stage 2 processing where it is required to determine the WCDMA basestation spreading code ($C_0$ to $C_{14}$), the fact that the basestation spreading code is repeated in every WCDMA RX frame (for a given base station frequency), if one TX slot of DCS is used, a maximum of three slots will be corrupted in a frame, however due to the timing difference of the DCS (TDD) and WCDMA (FDD) for the slot duration, this allows that a shift of the location of the next TX slots of DCS such for the next WCDMA frame, thus resulting in the need to observe three WCDMA frames to recover back all the spreading codes from $C_0$ to $C_{14}$.

Thus the total stage 2 time processing requires three WCDMA frames instead of 1 frame if the notch filter was not removed. However the total stage 2 processing is 30 ms instead of 10 ms which is still within the 3GPP requirements of maximum allowable time to report a new value.

Stage 3 requires only four WCDMA slots, which in the case of GPRS with '2 TX' slots, at least 4 non-corrupted WCDMA slots will be available for processing. Thus there is no change between removed or inserted notch filter for the required timing.

It will be appreciated that in all other respects than described above the processing stages 1-3 are performed as known in the prior art. This known processing will be within the knowledge of one of ordinary skill in the art, and need not be described further herein.

Figure 7:
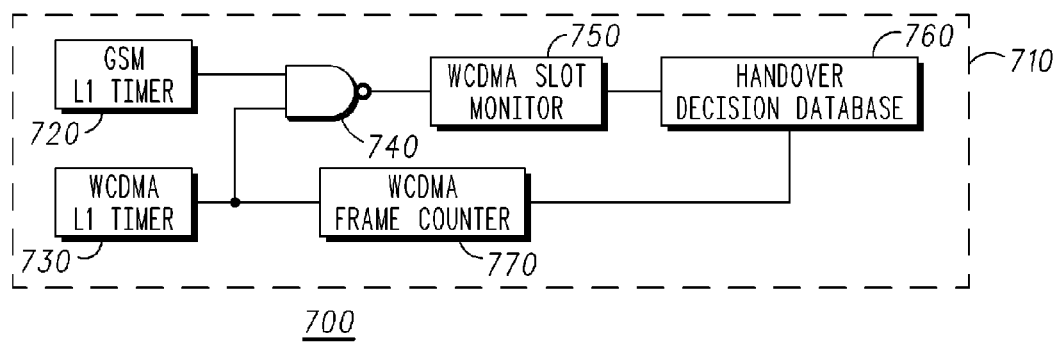
FIG. 7 shows a block schematic diagram of an arrangement for use in a dual band cellular communication handset utilising the present invention.

Referring now also to FIG. 7, in a preferred embodiment of the invention, a dual mode (WCDMA and DCS/PCS) cellular communication handset or mobile 700 incorporates an arrangement 710 to obviate the effects of corruption of WCDMA codes by DCS/PCS transmission as described above, without requiring use of a notch filter as in FIG. 1.

The arrangement 710 includes a GSM level 1 timer 720, a Wcdma level 1 timer 730, an inverting AND logic gate 740 having inputs coupled respectively to the outputs of the timers 720 and 730, a WCDMA slot monitor function 750, and a handover decision database 760 for holding inter alia information provided by the WCDMA slot monitor function 750. The arrangement 710 also includes a WCDMA frame counter 770 coupled to the output of the WCDMA level 1 timer and having an output coupled to the handover decision database 760.

Since the timing relation between the WCDMA and DCS/PCS systems is known in the mobile, software running in the mobile can keep track of the WCDMA L1 timer (720) and GSM L1 timer (730), in order to know when a TX DCS falls at the same time as a WCDMA slot and be able to decide to discard or disable WCDMA monitoring in the event of a corrupted WCDMA slot. In practice, the L1 timers 720 and 730 operate as follows:

the GSM L1 timer 720 counts in 'quarter of bit' GSM; therefore, GSM timing (ms)=Nqbits*1/(4*270.833 KHz), where Nqbits=Nbits*4 (Nbits being the number of GSM bits per period), i.e., the timer is clocked with a clock period equal to Tbits/4 to allow higher resolution counting.

WCDMA L1 timer counts in 'quarter of chip'; therefore, WCDMA timing (ms)=Nqchips*1/(4*3840 KHz), where Nqchips=Nchips*4 (Nchips being the number of WCDMA chips per period), i.e., the timer is clocked with a clock period equal to Tchip/4 to allow higher resolution counting.

When the L1 timers 720 and 730 indicate that TX DCS/PCS falls at the same time as a WCDMA slot, the inverted output of the AND gate 740 disables the WCDMA monitor 750, preventing corrupted WCDMA slots from affecting handover decisions. The WCDMA frame counter 770 counts the number of WCDMA frames received since the handover decision database 760 was last updated, and prevents it from being updated (i.e., delays updating) until three WCDMA frames have been received (thus, the frame counter 770 can be considered as providing both a frame detector and a delay element). In this way, the database can be considered as containing appropriate handover information from the WCDMA slot monitor 750.

It will be understood that although separate L1 WCDMA and DCS/PCS timers 720 and 730 are shown in FIG. 7, GSM timing can be derived from WCDMA timing using a single WCDMA L1 timer according to the following relation:

$$N q\text{bits elapsed}=Nq\text{chips}*270.833/3840,$$

e.g., one slot GSM of 625 quarter symbols (=156.25*4) is equivalent to 8861,549368 WCDMA quarter chips.

It will be appreciated that GSM and WCDMA base station networks are time synchronized to 0.5 ppm worst case, the use of separate L1 timers as shown should present no significant drift problems. It may also be noted that in the case of a single L1 timers being used for both systems instead of the two L1 timers, the AFC in GSM and WCDMA are known separately so can be used for timing updates if referenced to the single L1 timer (for targets lower than 0.5 ppm).

Although it takes three WCDMA frames to detect the FDD basestation SCH2 to know which basestation is monitored instead of one frame as previously, takings 30 ms instead of 10 ms, this does not impact the monitoring performance in terms of fading. If a '2 TX' slots DCS/PCS type of mobile is used (as in GPRS class 8), the timing to detect the SCH2 information is four frames instead of one frame; however, this is still not a problem since it is not impacted by fading and by any constraint of timing reporting (total allowed time: 1.5 seconds for 15 basestations).

Figure 8:
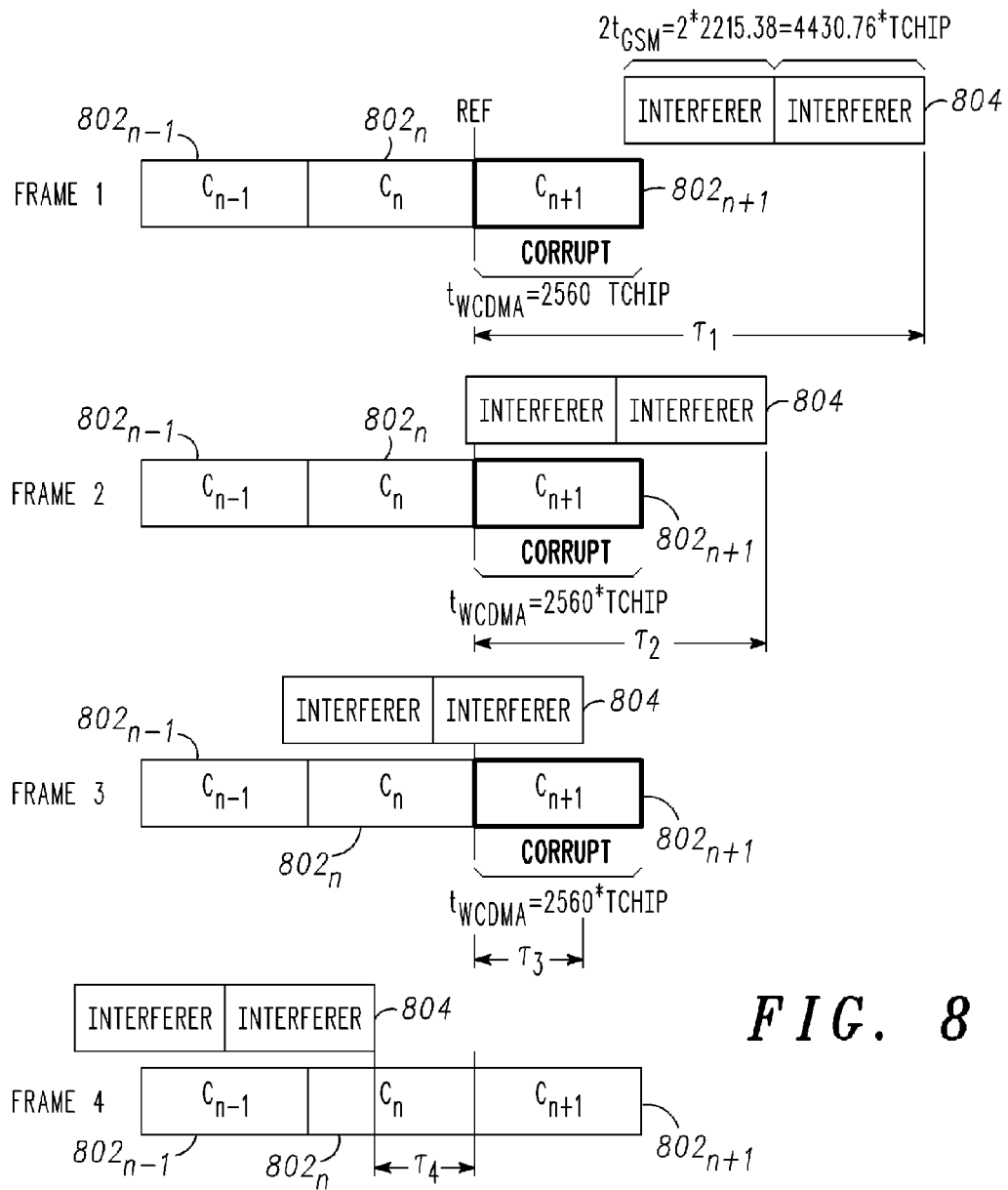
FIG. 8 shows a block schematic timing diagram, similar to that of FIG. 5, illustrating collisions/interference between slots in four consecutive frames of the WCDMA (receive) mode and two consecutive overlapping slots in 'GPRS class 8' (transmit) mode.

In FIG. 8 there is shown a pair of DCS/PCS consecutive transmitted slots 804 for the GPRS class 8 corrupting $C_{n+1}$ code slot $802_{n+1}$ of WBCDMA RX in three consecutive frames (Frame1, Frame2 and Frame3) but not in the next frame (Frame4). Thus, in this scenario four frames are required in order to ensure that slot $802_{n+1}$ is no more corrupted for stage 2 processing. As can be seen in FIG. 8:

in Frame1 a time interval from a reference point 'ref' (at the beginning of the WCDMA slot $802_{n+1}$) to the end of the DCS/PCS slots 804 has a duration $\tau_1$ given by $$\tau_1=6990.76*T\text{chip};$$

in Frame2 the time interval between 'ref' and the end of the DCS/PCS slots 804 has a duration $\tau_2$ given by $$\tau_2 = 6990.76 * Tchip - \text{`shift'} \text{ of the } DCS/PCS$$
$$\text{slots } \mathbf{804} \text{ between frames}$$
$$= (6990.76 - 2953.80) * Tchip$$
$$= 4036.96 * Tchip;$$

in Frame3 the time interval between 'ref' and the end of the DCS/PCS slots 804 has a duration $\tau_3$ given by $$\tau_3 = 6990.76 * Tchip - 2 * \text{`shift'}$$
$$= (6990.76 - 5907.60) * Tchip$$
$$= 1083.16 * Tchip; \text{ and}$$

in Frame4 the time interval between 'ref' and the end of the DCS/PCS slots 804 has a duration $\tau_4$ given by $$\tau_4 = 6990.76 * Tchip - 3 * \text{`shift'}$$
$$= (6990.76 - 8861.40) * Tchip$$
$$= -1870.64 * Tchip.$$

It will be appreciated that although embodiments of the invention have been described above in the context of a dual mode WCDMA and DCS/PCS cellular communication system, the invention may be more generally used in other dual mode communication systems in which interference may be experienced between simultaneous transmission in a first mode and reception in a second mode.

It will be appreciated that the dual mode WCDMA and PCS/DCS handset described above and shown in the drawings avoids the need for a conventional external notch filter. The WCDMA RX frame is allowed to have a few slots corrupted by the PCS/DCS transmitter noise during DCS transmission, and a scheme is used to recover the required information by not considering the corrupted slots. Due to the fact that during WCDMA FDD RX monitoring, the processing required is performed in stages, and since the information that is measured during a WCDMA frame (secondary channel synchronization, stage 2 processing) is repeated in every frame, if a given slot is corrupted in a WCDMA frame, in the next WCDMA frame the slot will be no more corrupted due to the difference in timing between the PCS/DCS transmitter protocol and the WCDMA timing protocol.

It will be appreciated that the method for use in a dual mode communication system described above will typically be carried out in software running on a processor (not shown), and that the software may be provided as a computer program element carried on any suitable data carrier (not shown) such as a magnetic or optical computer disc. It will also be appreciated that the arrangement for use in a dual mode communication system described above may alternatively be fabricated in an integrated circuit for use in a terminal of a communication system.

It will be understood that the arrangement and method for dual mode operation in a communication system described above provides the following advantages:

no external notch filter, reducing cost, size and power consumption,
maintained support for WCDMA (FDD) monitoring during DCS (TDD) call for UMTS system.

The invention claimed is:

1. An apparatus comprising:
a monitoring apparatus of a wireless communication terminal operative for receiving first mode signals in a first mode and second mode signals in a second mode, wherein the monitoring apparatus is arranged to operate in a slot synchronisation stage on a primary synchronisation channel, the received first and second mode signals comprising frames of different lengths and different numbers of slots in each frame, and successive slots of a first frame of the received second mode signals includes signal data that is repeated in subsequent frames of the received second mode signals, said monitoring apparatus including;
a monitoring arrangement operative, while the wireless communication terminal is communicating in said first mode, for monitoring signal data of the first frame and at least two consecutive frames of the received second mode signals consecutive with the first frame and processing said signal data of the first frame, the monitoring apparatus further operative for inhibiting processing of said signal data of the first frame received during a first slot of the first frame if the first slot is simultaneous with a transmission in said first mode, the monitoring arrangement including:
a frame detector configured to count a number of the subsequent frames of the received second mode signals; and
a delay element coupled to the frame detector, the delay element configured to delay the processing of said signal data until the frame detector detects reception of two of said subsequent frames of the received second mode signals, and to enable the monitoring arrangement to extract a second slot of a second frame of said received second mode signals and to enable the monitoring arrangement to process the signal data extracted from the second slot of the second frame of said received second mode signals in response to the frame detector detecting reception of two of said subsequent frames of the received second mode signals, the second slot corresponding to the first slot inhibited during the first frame, the second frame is subsequent the first frame, and is one of said at least two consecutive frames, and the second slot is not simultaneous with the transmission in said first mode.

2. The apparatus as claimed in claim 1, the monitoring apparatus further comprising a timer for detecting when a slot of a frame of the received second mode signals is simultaneous with transmission in said first mode.

3. The apparatus as claimed in claim 1, wherein said second mode comprises Code Division Multiple Access.

4. The apparatus as claimed in claim 3 wherein said first mode comprises GSM.

5. The apparatus as claimed in claim 4 wherein the first mode comprises DCS and the second mode comprises UMTS.

6. The apparatus as claimed in claim 1, wherein said monitoring apparatus is arranged to further operate in at least two additional stages of cell measurement, including a frame synchronisation stage on a secondary synchronisation channel, and a pilot channel determination stage, and to monitor said second mode signal data in at least said frame synchronisation stage.

7. The apparatus as claimed in claim 1 further comprising a memory for storing a handover decision database, wherein said delay element is arranged to delay updating of the handover decision database in response to said signal data of the received second mode signals until the frame detector detects reception of at least three of said subsequent frames of the received second mode signals.

8. A wireless communication terminal comprising the apparatus as claimed in claim 1.

9. An apparatus comprising:
  a monitoring apparatus of a wireless communication terminal operative for receiving first mode signals in a first mode and second mode signals in a second mode, wherein said monitoring apparatus is arranged to operate in a slot synchronisation stage on a primary synchronisation channel, the received first and second mode signals comprising frames of different lengths and different numbers of slots in each frame, and successive slots of a first frame of the received second mode signals includes signal data that is repeated in subsequent frames of the received second mode signals, said monitoring apparatus;
    a monitoring circuitry operative, while the wireless communication terminal is communicating in said first mode, for monitoring said signal data of the first frame and at least two consecutive frames of the second mode signals consecutive with the first frame and processing said signal data of the first frame, the monitoring circuitry further operative for inhibiting processing of said signal data of the first frame received during a first slot of the first frame if the first slot is simultaneous with a transmission in said first mode, the monitoring circuitry including:
      a frame detector configured to count a number of the subsequent frames of the received second mode signals; and
      a delay element coupled to the frame detector, the delay element configured to delay the processing of said signal data until the frame detector detects reception of two of said subsequent frames of the received second mode signals, and to enable the monitoring arrangement to extract a second slot of a second frame of said received second mode signals and to enable the monitoring arrangement to process said signal data extracted from the second slot of the second frame of the at least two consecutive second mode frames that is not simultaneous with transmission in said first mode in response to the frame detector detecting reception of two of said subsequent frames of the received second mode signals, and the second slot corresponding to the first slot inhibited during the first frame, the second frame is subsequent the first frame.

10. The apparatus as claimed in claim 9 comprising timer for detecting when a slot of a frame of the received second mode signals is simultaneous with transmission in said first mode.

11. The apparatus as claimed in claim 9 wherein said second mode comprises Code Division Multiple Access.

12. The apparatus as claimed in claim 11 wherein said first mode comprises GSM.

13. The apparatus as claimed in claim 12 wherein the first mode comprises DCS and the second mode comprises UMTS.

14. The apparatus as claimed in claim 9, wherein said monitoring apparatus is arranged to further operate in at least two additional stages of cell measurement, including a frame synchronisation stage on a secondary synchronisation channel, and a pilot channel determination stage, and to monitor said second mode signal data in at least said frame synchronisation stage.

15. The apparatus as claimed in claim 9 further comprising a memory for storing a handover decision database, wherein said delay circuitry is arranged to delay updating of the handover decision database in response to said signal data of the received second mode signals until the frame detector detects reception of at least three of said subsequent frames of the received second mode signals.

16. A wireless communication terminal comprising the apparatus as claimed in claim 9.

17. An apparatus comprising:
  a monitoring apparatus of a wireless communication terminal operative for receiving first mode signals in a first mode and second mode signals in a second mode, wherein said monitoring apparatus is arranged to operate in a slot synchronisation stage on a primary synchronisation channel, the received first and second mode signals comprising frames of different lengths and different number of slots in each frame, and successive slots of a first frame of the received second mode signals includes signal data that is repeated in subsequent frames of the received second mode signals, the monitoring apparatus including:
    monitoring circuitry operative, while the wireless communication terminal is communicating in the first mode, for monitoring signal data of the first frame and at least two consecutive frames of the received second mode signals consecutive with the first frame and processing the signal data of the first frame, the monitoring circuitry further operative for inhibiting processing of the signal data of the first frame received during a first slot of the first frame if the first slot is simultaneous with transmission of a first mode signal in the first mode, the monitoring circuitry including:
      a frame detector configured to count a number of the subsequent frames of the received second mode signals; and
      a delay element coupled to the frame detector, the delay element configured to delay the processing of said signal data until the frame detector detects reception of two of said subsequent frames of the received second mode signals, and to enable the monitoring arrangement to extract a second slot of a second frame of said received second mode signals and to enable the monitoring arrangement to process the signal data extracted from the second slot of the second frame of said received second mode signals that is not simultaneous with transmission of the first mode signal in the first mode in response to the frame detector detecting reception of two of said subsequent frames of the received second mode signals, and the second slot corresponding to a third slot inhibited during a previous one of the at least two consecutive second mode frames.

18. The apparatus as claimed in claim 17 wherein each slot in the first frame of the received second mode signals includes signal data of the received second mode signals that is repeated in a corresponding slot of a frame of the at least two consecutive frames of the received second mode signals.

19. The apparatus as claimed in claim 17 wherein said first mode comprises GSM.

20. The apparatus as claimed in claim 17 wherein the first mode comprises DCS and the second mode comprises UMTS.

* * * * *

UNITED STATES PATENT AND TRADEMARK OFFICE
CERTIFICATE OF CORRECTION

PATENT NO. : 8,139,540 B2  
APPLICATION NO. : 11/571099  
DATED : March 20, 2012  
INVENTOR(S) : Nadim Khlat et al.

Page 1 of 1

It is certified that error appears in the above-identified patent and that said Letters Patent is hereby corrected as shown below:

In the Claims:

In Column 9, Line 16, please change "apparatus;" to --apparatus including;--.

Signed and Sealed this  
Fourth Day of June, 2013

Teresa Stanek Rea  
*Acting Director of the United States Patent and Trademark Office*